: 3,719,694
Patented Mar. 6, 1973

3,719,694
SOLID NITROLOTRIACETATE-IRON AND ZINC METAL COMPLEXES
William A. Feiler, Kirkwood, and Chung Yu Shen, St. Louis, Mo., assignors to Monsanto Company, St. Louis, Mo.
No Drawing. Filed Sept. 29, 1969, Ser. No. 862,069
Int. Cl. C07f 3/06, 15/02
U.S. Cl. 260—429.9       7 Claims

ABSTRACT OF THE DISCLOSURE

Solid nitrilotriacetate (NTA)-metal complexes having a molar ratio of at least 1.5 to 1, the metal being cobalt, iron, nickel or zinc, are useful as micronutrients for plants and as catalysts in various chemical reactions. The solids complexes are prepared by reaction of the metal salts with NTA in a molar ratio of at least 1:1.5. An acid is used to adjust pH and stabilize the solid complexes.

BACKGROUND

Field of the invention

This invention relates to solid complexes of nitrilotriacetate (hereinafter referred to as NTA) and a metal which is either cobalt, zinc, nickel or iron having a molar ratio of at least 1.5:1 and which is useful as a micronutrient for plants and as a catalyst in chemical reactions.

Description of the prior art

It is a well-annotated observation that the addition of chelated metal to the soil is a valuable treatment for overcoming chlorosis in plants. Although soils commonly contain large amounts of one or more of the metals, they are often unavailable, i.e., the compounds incorporating these metals do not release them to the plant. It has been found that these metals may be supplied to plants in an available form as respective metal sulfate. When the metals are added in the form of sulfate or equivalent compound relatively large quantities must be added due to the poor efficiency of the plant utilizing metal from these compounds. It has also been found that plants can more efficiently obtain these metals from some metal amine chelating compounds, e.g., the zinc salt of ethylene diaminetetraacetic acid. Use of these expensive metal chelating compounds have been limited to those few instances where, because of peculiar conditions of plant physiology or soil conditions, the plant is incapable of absorbing the trace metal when present in its natural form, or the less expensive metal sulfate.

In an effort to avoid the drawbacks of the use of ethylene diaminetetraacetic acid (EDTA) U.S. Pat. 2,891,854 disclosed the use of iron chelates of diethylenetriaminepentaacetic acid (DTPA). This patent taught that in marked contrast to the iron-EDTA chelate, the iron-DTPA chelate is much more effective in alkaline soils and much less toxic to the treated plant. In an attempt to meet the objections of the prior art U.S. Pat. 3,115,511 proposed the use of iron chelate compositions which is the reaction product of a mole of an amino acid and a mole of powdered iron. Another approach to the problem is offered by British Pat. 1,094,781 wherein a combination of the metal salt and metal aminoacetate is employed, e.g., zinc nitrilotriacetate and zinc sulfate in a ratio of 1:3.

SUMMARY OF THE INVENTION

It is an object of this invention to provide a composition which is more effective in supplying trace metal micronutrients to plants and to provide a more convenient composition useful as a catalyst. It is another object of this invention to provide a simple direct means of preparing process for preparing the compositions of this invention. Other objects and advantages will become apparent upon inspection of this specification.

The invention sought to be patented, in its composition aspect, is described as residing in the concept of a plant micronutrient or a catalyst which is a chelate containing at least 1.5 mole of nitrilotriacetate and one mole of cobalt, zinc, nickel or iron as the metal active ingredient.

The invention sought to be patented, in its process aspect, is described as residing in the concept of a reaction between nitrilotriacetate and a metal salt with a mole ratio of at least 1.5 to 1 in the presence of a small amount of water. The products of this process are stabilized against oxidation by the admixing of small amounts of mineral acid with the reactants.

DESCRIPTION OF THE PREFERRED EMBODIMENTS

The novel complexes of this invention are prepared by reacting an intimate admixture of one mole of the metal salt, such as sulfate, nitrate, chloride, carbonate or oxide with at least 1.5, and preferably 1.6 to 2.5, moles of nitrilotriacetate such as sodium, potassium or ammonium salt, or NTA acid at a temperature from 0° to about 100° C. and preferably from about 50 to 90° C. The time of the reaction will vary depending upon the temperature at which the reaction is carried out, time ranging from about 36 hours at room temperature to about 3 minutes at 100° C.

The material to be reacted is preferably in a finely divided (particulate) state, the finer the particle size the more complete the reaction in a shorter period of time. It is particularly desirable that 95% by weight of the reactants employed in the process of this invention pass through a United States sieve of 20 mesh.

In carrying out this reaction it is desirable to carry the reaction out with a low amount of water, usually this is limited to the amount of water present as water of hydration.

It is also been found useful to add small amounts of mineral acid such as sulfuric acid, hydrochloric acid or the like as an oxidation stabilizer for the novel complexes of this invention. It is particularly advantageous to employ the sulfuric acid in the preparation of the iron complex. When adding sulfuric acid the amount of 98% acid may vary up to 15 pounds for every 100 pounds of iron complex formed, generally about 12 pounds is satisfactory. When properly stabilized, a 10% solution of the iron complex has a pH of 4 to 5.

The novel solid complexes of this invention can be prepared in any of the various standard reactors, provided an intimate contact between the reactants is obtained. A reactor with a sigma-blade is particularly suited for this reaction. The reaction of NTA with a hydrated metal salt (and acid when desired) goes through a sticky stage when the NTA is entered as a solid.

After the reaction is completed the resulting product is dried in conventional equipment to remove any moisture or condensate.

The novel solid complexes of this invention are useful as a micronutrient plant food and are applied as any other plant food. They can be admixed with other solids and applied as a conventional solid fertilizer or put into aqueous solution and applied either separately or with other liquid plant foods with conventional applicators such as sprays.

The metal chelate or complex, because of its greater solubility in a number of solvents, its stability, and its definite metal content, is a convenient form of catalyst in many chemical reactions. The novel complexes of this invention, because of their high, unusual stability, are desired as a catalyst in many chemical reactions where oxygen transfer is involved. More specifically, it is often used in reactions where oxidation is taking place, such as oxidation, bleaching, and drying unsaturated linseed oil. These complexes are employed for these purposes in an amount of from 0.1 to 10,000 p.p.m. depending on the particular use being made. It is within the ordinary skill of one in this art by simple routine test to establish the desired amount for each application. For example, in bleaching desirable results are obtained by the use of from about 0.25 to 5.0 p.p.m. of the complexes of this invention.

The following examples are included to illustrate the preparation of the novel solid complexes of the present invention but are not to be considered limiting. Unless otherwise specified all parts are by weight and all temperatures are degrees centigrade.

Example 1

To a sigma-blade type blender having a rotor speed of 31.5 revolutions per minute was charged 50.5 parts of zinc sulfate heptahydrate and 96.6 parts of sodium nitrilotriacetate monohydrate. The reaction was completed in 10 minutes, the reaction temperature being about 80° C. The resulting product $Na_4Zn(N(CH_2CO_2)_3)_2 \cdot 2H_2O$ yield was 100 parts. Water (22.1 parts) was removed and 25 parts of sodium sulfate as a byproduct was obtained. The novel solid NTA-zinc complex product gives the following distinctive X-ray diffraction pattern (first fifteen lines):

$Na_4Zn(N(CH_2CO_2)_3)_2 \cdot 2H_2O$

| $2\theta$* | d | $I/I°$ |
|---|---|---|
| 9.6 | 9.2 | 59 |
| 12.2 | 7.2 | 32 |
| 12.6 | 7.0 | 15 |
| 12.9 | 6.9 | 17 |
| 13.4 | 6.6 | 68 |
| 13.7 | 6.4 | 70 |
| 15.8 | 5.6 | 58 |
| 17.5 | 5.1 | 13 |
| 18.2 | 4.9 | 36 |
| 18.5 | 4.8 | 44 |
| 19.6 | 4.5 | 100 |
| 20.0 | 4.4 | 28 |
| 20.7 | 4.3 | 5 |
| 22.0 | 4.0 | 43 |
| 22.2 | 4.0 | 58 |

*With Cu K$\alpha$ radiation.

The solubility of the zinc solid complex was determined to be approximately 54.5% solids. The density of the saturated solution was 1.244 gm./cc.

Example 2

Using the procedure of Example 1, 65.5 parts of iron sulfate heptahydrate and 107 parts of sodium nitrilotriacetate monohydrate were charged to the reactor. Also 12.1 parts of 98% sulfuric acid were added to the reactor. One hundred parts of $Na_4Fe(N(CH_2CO_2)_3)_2 \cdot H_2O$ solid complex was obtained with a purity of 98.4%. A sodium sulfate byproduct of 45.1 parts was obtained while 37.9 parts of water were removed. The solid complex product had an X-ray diffraction pattern (first fifteen lines) as follows:

$Na_4Fe(NCH_2COO)_2 \cdot H_2O$

| $2\theta$* | d | $I/I°$ |
|---|---|---|
| 11.6 | 7.6 | 46 |
| 13.2 | 6.7 | 100 |
| 14.4 | 6.2 | 22 |
| 16.1 | 5.5 | 31 |
| 16.3 | 5.4 | 28 |
| 17.0 | 5.2 | 18 |
| 18.2 | 4.9 | 66 |
| 19.6 | 4.5 | 48 |
| 20.4 | 4.4 | 55 |
| 21.2 | 4.2 | 58 |
| 22.6 | 3.9 | 31 |
| 25.9 | 3.4 | 18 |
| 26.6 | 3.4 | 40 |
| 28.5 | 3.1 | 25 |
| 30.0 | 3.0 | 89 |

*With Cu K$\alpha$ radiation.

The freshly prepared solid complex product (unstabilized) has a dark olive green color which upon drying becomes a light tan. A concentrated solution (approximately 35%) has a pH of 8.8 and slowly oxidizes to a very dark solution from which a solid precipitates when no sulfuric acid is utilized as a stabilizer. However when sulfuric acid is used to stabilize the solid complex no precipitates form although the concentrated solution darkens with time.

Example 3

The solid iron complex of Example 2 was used to treat iron-chlorotic Hamlin orange trees growing on acid sandy soils in Florida. The complex was applied at three different rates—10, 20 and 40 gms. of iron per tree. Trees treated at all three levels of application showed visible greening over the untreated control trees.

Example 4

Field grown flax in the vicinity of Beeville, Tex. was treated with the solid complex micronutrients of this invention. Test plots treated with 8.4 kg./hectare of the solid zinc complex of Example 1 by soil treatment application showed visibly greater greening over the control plots. Yields were increased to 12.2 hectoliters/hectare whereas without the application of this compound, yields were 8.7 hectoliters/hectare.

Example 5

Following the procedure of Example 1, 280 parts of cobalt sulfate heptahydrate were reacted with 550 parts of sodium nitrilotriacetate monohydrate in the reactor. The $Na_4Co(N(CH_2CO_2)_3)_2 \cdot H_2O$ solid complex yield was 527 parts with about 20 percent sodium sulfate as a coproduct. The novel solid NTA-cobalt complex product gives the following distinctive X-ray diffraction pattern (first fifteen lines)

$Na_4Co(N(CH_2CO_2)_3)_2 \cdot H_2O$

| $2\theta$* | d | $I/I°$ |
|---|---|---|
| 9.6 | 9.2 | 100 |
| 12.2 | 7.4 | 14 |
| 13.4 | 6.6 | 18 |
| 13.7 | 6.5 | 21 |
| 15.7 | 5.6 | 21 |
| 18.2 | 4.9 | 18 |
| 18.6 | 4.8 | 11 |
| 19.6 | 4.5 | 29 |
| 20.0 | 4.4 | 12 |
| 22.0 | 4.0 | 19 |
| 23.1 | 3.8 | 31 |
| 24.8 | 3.5 | 21 |
| 26.0 | 3.4 | 19 |
| 30.2 | 3.0 | 11 |
| 31.2 | 2.9 | 11 |

*With Cu K$\alpha$ radiation.

In a similar manner the solid NTA-nickel complex of this invention is prepared.

Example 6

A complex of iron and NTA was prepared according to the procedure of Example 2 except that the ratio was 1 mole of iron to 1.73 moles of sodium NTA. Field grown turnips in the vicinity of Sandford, Fla. (in Leon fine sand) were treated with the solid complex prepared in this example. Test plots containing the chlorotic, half grown turnips were treated with a foliar spray at the rate of 18.7 hectoliters/hectare followed by a second spraying 8 days later. The spray contained 906 grams per 3.8 hectoliters. Two weeks later the turnips were rated for color improvement on a scale of 0=no improvement and 5=normal green foliage. The greatly improved turnips were rated 4.

Example 7

Replicate unbleached cotton swatches (12.7 cm. on each side) were bleached in hard water (hardness 120 p.p.m.) at 40° C. with 22.6 p.p.m. active oxygen for 10 minutes in the presence of 0.15 percent by weight of a commercial laundry detergent based on anionic surfactants and sodium tripolyphosphate builder in a laboratory type miniature version of an agitator type washing machine. Color difference meter measurements were made on the swatches before and after bleaching. The improvement of using 0.25 p.p.m. of the iron complex of Example 2 in the bleach bath was 42% over ferrous sulfate at 1 p.p.m., 17% over sodium NTA at 1 p.p.m. and 11% over a complex of iron and sodium NTA in a molar ratio of 1:1. Similarly the improvement of using 1 p.p.m. of the zinc complex of Example 1 in the bleach bath was 20% over sodium NTA and 15% over a complex of zinc and sodium NTA in a 1:1 molar ratio.

Similar catalyst results are obtained with the cobalt and nickel solid complexes of this invention.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

Having thus described our invention, what we desire to claim and secure by Letters Patent is:

1. Solid complexes of a nitrilotriacetate selected from the group consisting of tripotassium nitrilotriacetate, trisodium nitrilotriacetate and triammonium nitrilotriacetate and a metal selected from the group consisting of iron and zinc, the molar ratio of nitrilotriacetate to metal being from 1.5:1 to 2.5:1.

2. The solid complex of claim 1 wherein the metal is iron.

3. The solid complex of claim 1 wherein the metal is zinc.

4. A method of preparing solid complexes of claim 1 by reacting an admixture of a particulate metal salt with particulate ammonium, sodium, or potassium nitrilotriacetate in a molar ratio of metal salt to nitrilotriacetate of from 1:1.5 to 1:2.5 at a temperature of about 0° to 100° C. in the presence of water of hydration from said nitrilotriacetate and/or metal, with at least 95% by weight of the particles of reactants passing through a United States 20 mesh screen.

5. The method of claim 4 wherein the metal salt is a sulfate and the nitrilotriacetate is sodium nitrilotriacetate.

6. The method of claim 4 wherein the temperature is from about 50 to about 90° C.

7. The method of claim 4 wherein the reaction is carried out in the presence of a stabilizing amount of sulfuric acid.

References Cited

UNITED STATES PATENTS

| | | | |
|---|---|---|---|
| 2,859,104 | 11/1958 | Kroll | 71—1 |
| 3,095,297 | 6/1963 | Rembe | 71—1 |

OTHER REFERENCES

Brintzinger et al., Z. für Anorg. Chemie vol. 254 (1947), pp. 271–284.

Brintzinger et al. Z. für Anorg. Allgem Chem. vol. 249 (1942), pp. 299–307.

Kirson et al., Bull. Soc. Chim. France, 1961, pp. 1081–1084.

Elovich et al., Chem. Abst. 56 (1961), column 15139.

Smith, The Sequestration of Metals, the Macmillan Co., New York, N.Y., 1959, p. 85.

Pfeiffer et al., Berichte, 75 (1942B), pp. 1–12.

Kirson et al., Bull. Soc. Chim. France, 1961, pp. 1101–5.

WERTEN F. W. BELLAMY, Primary Examiner

U.C. Cl. X.R.

260—439, 429 J; 204—48, 260—535 F